July 24, 1962 L. R. SHEFFER 3,045,413
TANDEM MOWING MECHANISM
Filed March 2, 1959 4 Sheets-Sheet 1

Inventor
Leonard R. Sheffer
by Harry A. Smith
His Attorney

July 24, 1962  L. R. SHEFFER  3,045,413
TANDEM MOWING MECHANISM
Filed March 2, 1959  4 Sheets-Sheet 2
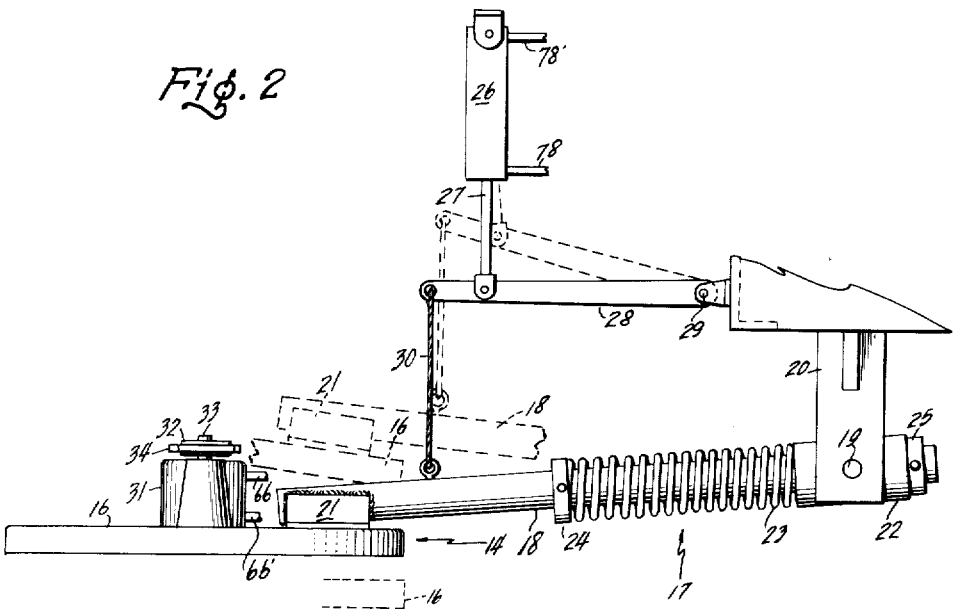
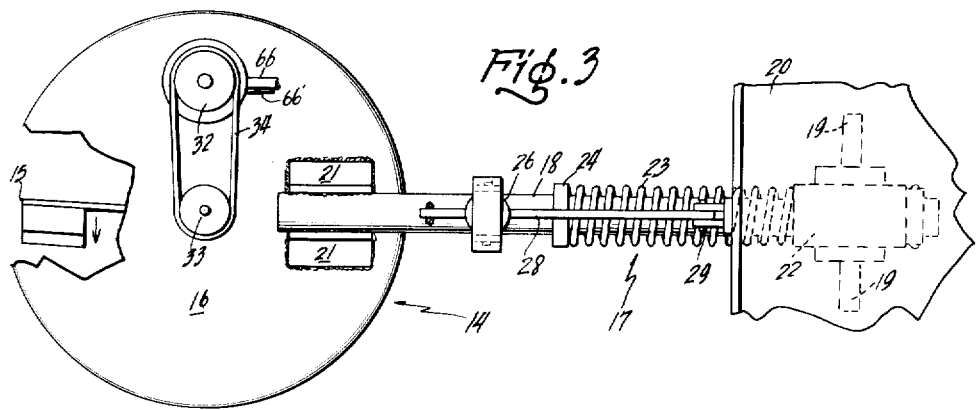
Inventor
Leonard R. Sheffer
by Harry A. Smith
His Attorney

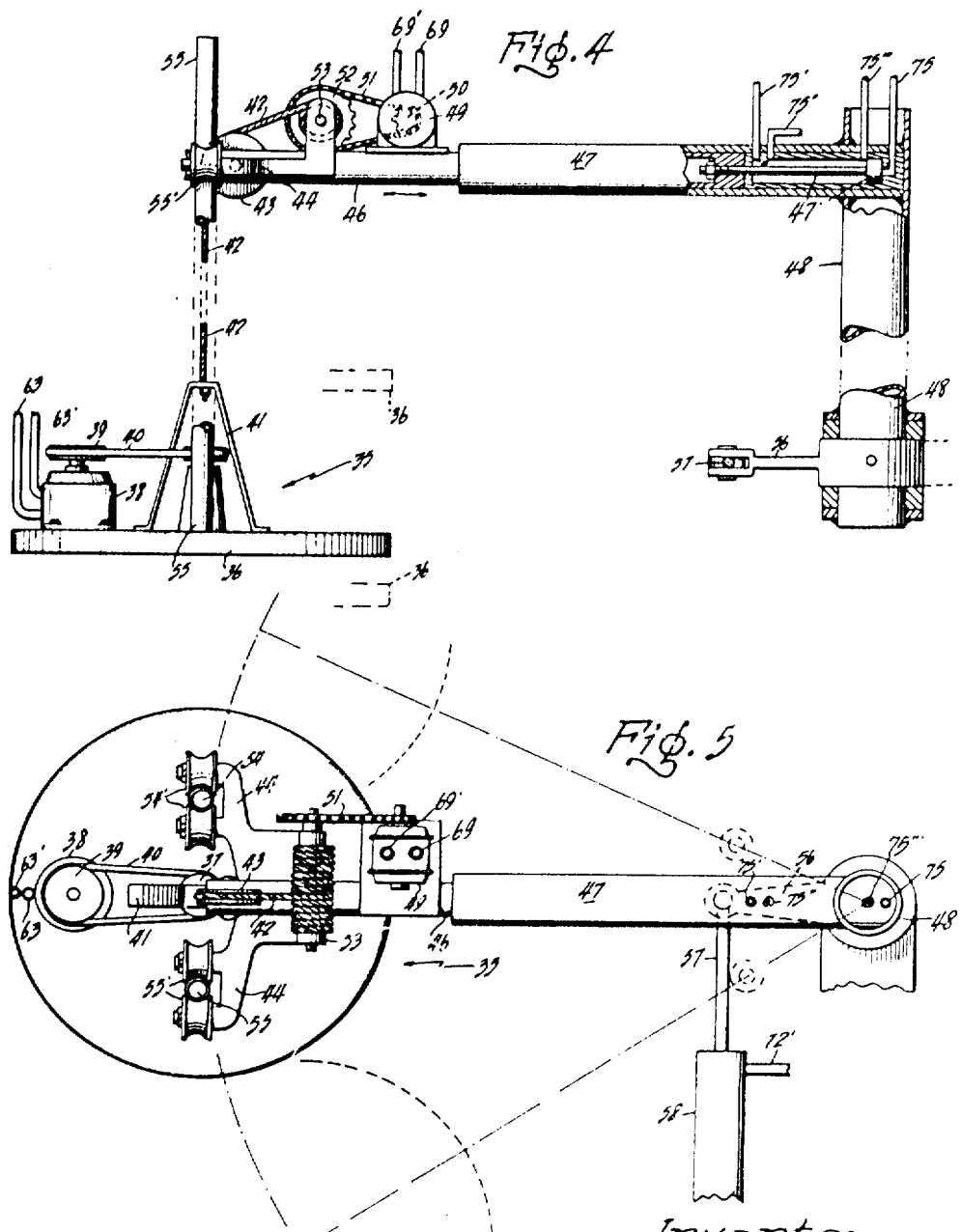

July 24, 1962   L. R. SHEFFER   3,045,413
TANDEM MOWING MECHANISM
Filed March 2, 1959   4 Sheets-Sheet 4

Inventor
Leonard R. Sheffer
by Harry A. Smith
His Attorney

United States Patent Office 3,045,413
Patented July 24, 1962

3,045,413
TANDEM MOWING MECHANISM
Leonard R. Sheffer, R.D. 2, Valley Falls, N.Y.
Filed Mar. 2, 1959, Ser. No. 796,587
8 Claims. (Cl. 56—25.4)

This invention relates to mowing machines, having particular reference to such a machine having tandem cutting mechanisms, adapted to be connected to a suitable vehicle or tractor for cutting or mowing grass, weeds, hay, and the like in a continuous path simultaneously on both sides of such obstacles as guide rail fences, posts, poles, trees, etc., especially adjacent highways and roadsides, and the provision of such a machine is the principal object of the invention.

Conventional types of mowing machines having a single cutter, such as sickle bars and the like, are an everyday sight along highways and roadsides, at seasonable times of the year, for cutting or mowing along the near side of such obstacles. However, a considerable amount of manual labor is necessary to clear such grass, weeds, hay, etc. along the far side of such obstacles by the employment of groups of laborers using scythes and other cutting tools which is slow, laborious, time-consuming, and makes for needless expense and waste to be borne by members of the public. It has long been felt that it would be a distinct improvement if such disadvantage could be overcome and this has now been accomplished by means of the persent invention.

Generally, it is an object of the invention to provide such a machine provided with such a tandem mowing mechanism that is economic of manufacture, simple, yet sturdy and durable of construction, that will operate with relative freedom from wear and tear and other mechnical difficulties, and is otherwise well suited to the purposes for which it is intended.

More specifically, it is an object of the invention to provide a tandem mowing machine that will operate on both sides of upstanding obstacles in the path thereof, such as line fences, trees, poles, etc., comprising a first cutter mounted to extend laterally from a tractor to mow in a path along the near side of the obstacles, and a second cutter mounted to extend laterally from a tractor to mow in a path along the far side of the obstacle, and power means mounted on the tractor and cooperatively connected with the cutter to actuate the same to mow a single continuous path along both sides of the obstacle.

Yet more specifically, it is an object of the invention to provide such a machine adapted to be connected to a tractor which involves a tandem mowing mechanism for moving a single continuous path on both sides of an obstacle upwardly projecting from the ground line in the path thereof, such mechanism comprising a first device having a cutter adapted to mow in a path along the near side of the obstacle, a first actuatable means mounted at one end on the tractor and laterally extending therefrom to mount the first device at its other end, a second device having a cutter adapted to mow in a path along the far side of said obstacle, with a second actuatable means mounted at one end on the tractor and laterally extending therefrom to mount the second device at its other end, and a primary power means mounted on the tractor and cooperaitvely associated with both cutter devices to actuate the same, and to actuate the first and second actuatable means to shift both devices into and out of operating position with respect to both the near and far sides of the obstacle.

Another specific object of the invention is to provide cutting elements, preferably rotary blades underlying protective obstacle bumper guards mounting driving motors therefor, preferably of the hydraulic type, cooperatively connected to the primary power means.

A further specific object is to provide an actuatable means for said first device in the form of a pivotally mounted boom to raise and lower such device, preferably by means of a hydraulically operated piston.

Yet another specific object of the invention is to provide a second actuatable means in the form of a radial boom carrying said second cutter that can be swung through an arc extending between the near and far sides of said obstacle and to raise and lower the cutter vertically, said boom likewise preferably being hydraulically operated by said primary power means.

Other objects of the invention will in part be obvious and will in part appear hereinafter.

The invention accordingly comprises the features of construction, combination of elements, and arrangements of parts, which will be exemplified in the construction hereinafter set forth and the scope of the application of which will be indicated in the claims.

For a fuller understanding of the nature and objects of the invention reference should be had to the following detailed description taken in connection with the accompanying drawings, in which:

FIG. 2 is a side elevational view of the first cutter device and first actuating means;

FIG. 3 is a plan view, with parts broken away, of the device shown in FIG. 2;

FIG. 4 is a side elevational view of the second cutter device and actuating means, with parts broken away;

FIG. 5 is a plan view of FIG. 4;

Figure 1:
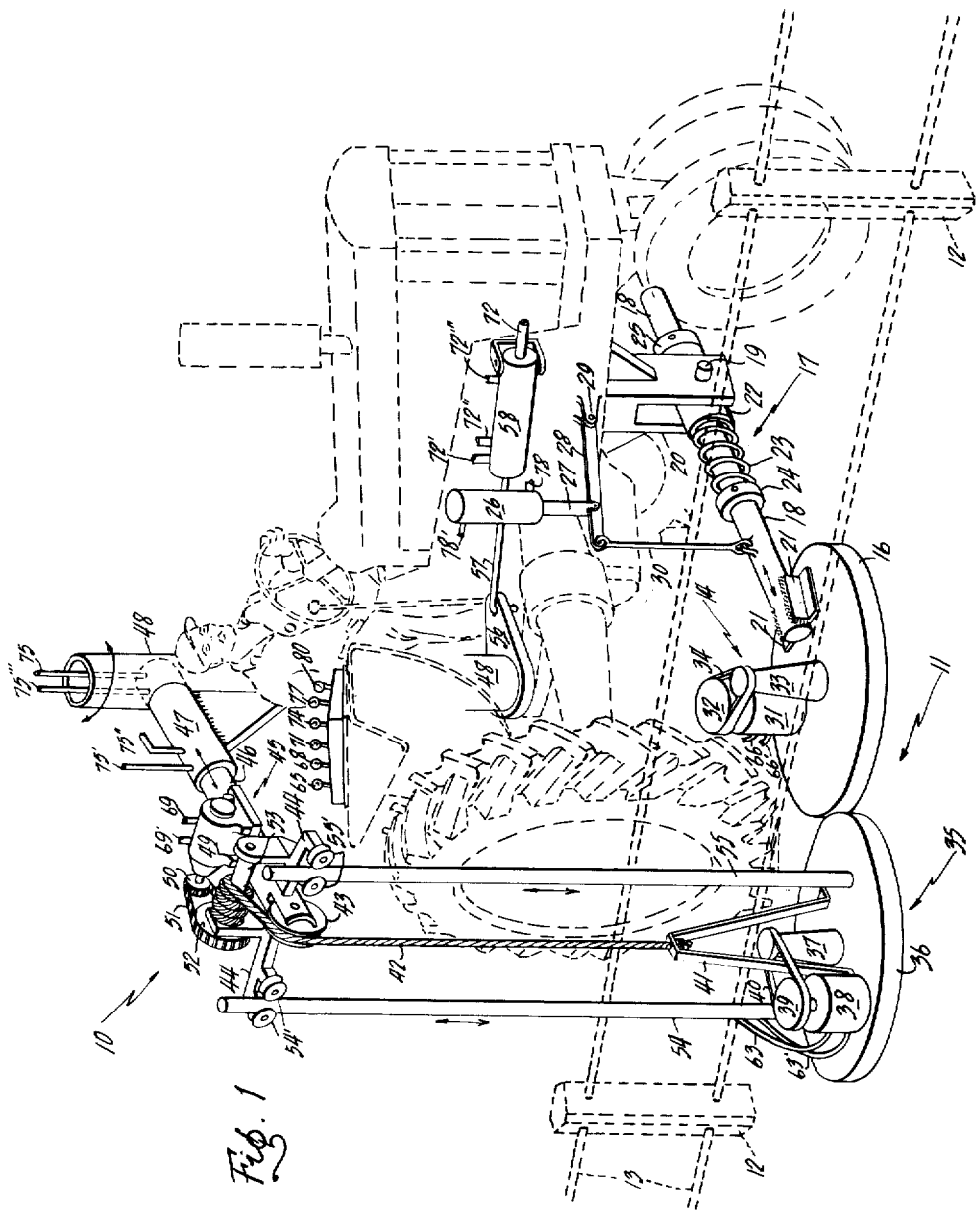
FIG. 1 is a perspective view of a preferred form of the invention illustrating the same, connected to a tractor shown in dotted line position.

Referring more particularly to the drawings, there is indicated generally at 10 a preferred form of the invention connected to a tractor.

A tandem mowing mechanism indicated generally at 11 is shown adapted to mow along a single continuous path on both sides of an obstacle upwardly projecting from the ground line in the path thereof, such as the protective guard rail or fence seen along many highways consisting of spaced concrete posts 12 with upper and lower cables 13. The tandem mechanism shown in the drawing comprises a first cutter device indicated generally at 14 which preferably utilizes a rotary cutter 15 (see FIG. 3) covered by a circular housing 16 constituting also a protective obstacle bumper guard.

A first actuatable means indicated generally at 17 for said cutter device 14 comprises a boom 18 that laterally extends from the tractor and is pivotally mounted, as at 19, in a clevis frame 20. At its outer end the boom carries the first cutter device 16 by means of two angle irons 21 welded thereto and to said housing 16. The boom 18 extends through a sleeve 22 which carries the trunnions 19 by which the same is pivotally mounted, as mentioned above, and the boom 18 extends therethrough and whereinafter it is spring-loaded by means of a spring 23 held between collets 24 and 25 so that the boom and the cutter device are automatically reciprocable toward and away from the tractor on the near side thereof, especially when the bumper guard comes in contact with an obstacle or the other cutter device about to be described. However, the first cutter device 14 can also be raised and lowered vertically by means of an hydraulic piston 26 mounted on the side of the tractor, the piston having a shaft or link 27 connected to a lever 28 pivotally mounted at 29 on the side of the tractor. The link 27 is in turn connected to the boom 18 by means of a link rod 30, the operation of the piston being more fully described hereinafter in connection with the primary power means.

The rotary cutter blade 15 under the guard 16 preferably is driven by means of an hydraulic motor 31 mounted on the top of the guard, the same having a pulley 32 which is connected to a driving shaft 33 for the cutter by means of a belt 34. The operation thereof likewise will be described hereinafter in connection with the primary power means.

The second cutting device is indicated generally at 35 and is similar in construction to the first cutting device 14 in that it carries a rotary cutter blade 15 under a circular guard or protective bumper housing 36 and likewise has a driving shaft 37 for the cutter which is rotated by a second hydraulic motor 38 mounted on the housing 36 which also drives a pulley 39 connected to the top of the shaft 37 by means of a belt 40, the operation of which will also be described hereinafter.

Both housings 16 and 36, on their undersides, may be provided with pivotally mounted ground shoes, or skids (not shown).

The second cutting device, however, is differently supported in operative position than the first cutter device. This is accomplished by means of a brace or bracket 41 secured to the housing 36 in upstanding position over the center thereof. A cable 42 passes over an idler pulley 43 in a crosshead 44 of a second actuatable means, indicated generally at 45. This second actuatable means comprises a boom 46 which is reciprocably mounted in a cylinder 47 with an hydraulically operated piston and is cantilevered from a vertical mast 48 secured to the rear of the tractor. The outside end of the boom 46 also carries an hydraulically operated motor 49 which has a driving pinion 50 to drive a chain 51 of a winch pulley 52 mounted on a shaft 53 of the crosshead 44, around which shaft the cable 42 is wound or unwound to raise and lower the second cutting device 35.

In order that the second cutting device can be raised and lowered substantially vertically without rotary motion of the entire device when being so raised and lowered, there are provided two parallel guide bars 54 and 55 fixedly secured to the housing 36 at their bottoms. These guide bars project upwardly through two pair of guide rollers 54′ and 55′, carried by the crosshead 44, and these rollers have a slight amount of play therein to allow for a substantially oscillatory effect of the second cutter mechanism 35.

The mast 48 is provided at its bottom with a link 56 which is pivotally connected to a piston rod 57 of a piston 58 mounted on the side of the tractor, which piston is hydraulically operated in connection with the primary power means about to be described together with the several other hydraulically operated pistons and associated mechanisms above referred to.

Figure 6:
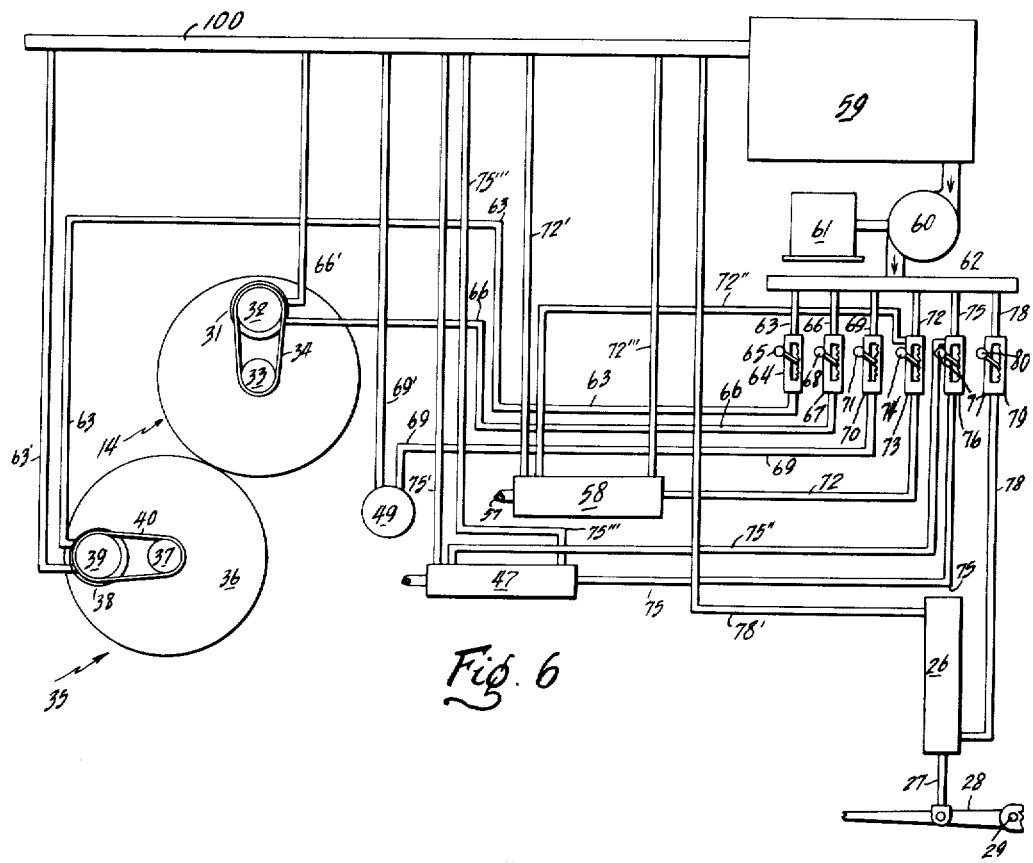
FIG. 6 is a block diagram of the primary power means in line circuit with the tandem cutting mechanism.
Figure 7:
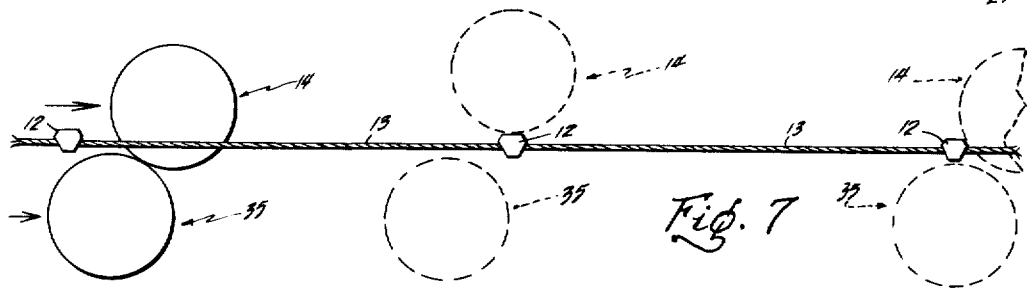
FIG. 7 is a diagrammatic illustration of the tandem cutting mechanism as the tractor moves from left to right, as shown in the drawing.
Figure 8:
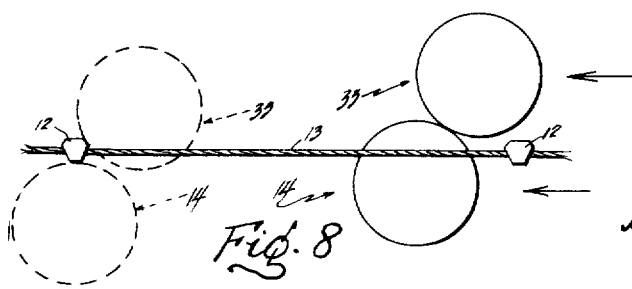
FIG. 8 is a view similar to FIG. 7 with the structure moving from right to left as shown in the drawing.

The primary power means is shown in diagrammatic form in FIG. 6. It comprises a tank 59 to hold any suitable type of fluid or liquid, such as oil, water, or the like. In communication with the tank is a pump 60 operated by any suitable driving means such as a motor 61, although it will be understood that it is within the contemplation of the invention to utilize a power take-off from the tractor motor itself. The pump communicates with a header 62 for the transmission of fluid to which is connected a plurality of conduits in line circuit with the various actuating means and mechanism above described. The first conduit 63 leads to a valve 64 that is opened and closed by a manually operated lever 65. The line or conduit 63 is connected to the motor 38 of the second cutter device 35 from which a return conduit 63′ leads to a main return line 100 communicating with the tank 59. A second conduit 66 leads to a valve 67 which is manually operated by a lever 68. This line leads to the motor 31 of the first cutter device 14 and a return line 66′ leads back to the main return line 100.

A third conduit 69 leads to a valve 70 having a manually controlled lever 71 and the line 69 leads to the motor 49 to raise and lower the second cutting device 35. A return line 69′ leads to the main return line 100.

A fourth conduit 72 leads to a valve 73 under the control of a manual lever 74 and the conduit 72 leads to the piston 58 which is connected to the arm 56 by the rod 57 to radially rotate the mast 48. A return line 72′ leads from the piston 58 to the main return line 100. It will be observed that it is desirable that the mast can be rotated through an arc whereby the entire radial means 45, supported on the cantilevered boom arrangement, can swing the cutter device 35 from a position adjacent the cutter device 14 on the far side of the obstacle to a position on the near side thereof and to a suitable distance therebeyond. It is likewise necessary that the entire radial means and associated mechanism be returned to the same position and for this reason the valve 73 should be a double action valve. In order to have the valve operate in this manner there is a second conduit 72″ leading from the valve 73 to the piston 58 and a return conduit 72‴ leads therefrom to the main return line 100. A fourth conduit 75 leads from the header 62 to the valve 76 under the control of a manual lever 77. The conduit 75 continues from this valve to the piston cylinder 47 containing the piston 47′ therein as shown in FIG. 4. This piston has a conduit 75′ extending therefrom to the main return line 100. Since the piston 47′ is connected to the boom 46, it enables the entire mechanism, such as the motor 49, the winch, the header 44 and the second cutting device to be moved toward and away from the tractor, as well as toward and away from the obstacle, especially on the far side thereof. Since the boom 46 is reciprocable, the valve 76 is also a double action valve and therefore a return line 75″ extends from the cylinder 47 back to the valve 76. Likewise, a return conduit 75‴ extends from the cylinder 47 to the main return line 100.

A sixth conduit 78 leads from the header 62 to a valve 79 under the control of a manual lever 80. The conduit 78 extends from this valve to the cylinder or piston 26 and has a return conduit 78′ leading therefrom to the main return line 100.

The entire operation of the device will be clear from the description of the primary power means above described and which is clearly and diagrammatically illustrated in FIG. 6. This power plant, unless a power take-off from the tractor motor is used, is very conveniently located on the tractor and the various levers, 65, 68, 71, 74, 77 and 80, for operating the various actuating means and tandem cutting devices are mounted within easy reach of the operator as shown in FIG. 1 of the drawings. With this type of tandem mowing mechanism it will be clear that the first cutter device 14 can readily be raised and lowered on the near side of the obstacle and that, when raised, or when the bumper guard strikes the near side of the obstacle, the entire device will be easily deflected but automatically returned because of the spring-loaded boom.

The second cutter device is likewise just as easily operated under the control of an operator but is more versatile or sophisticated in its operation in that, while to a certain extent being suspended in a pendulating manner, it is easily raised and lowered vertically through a considerably greater distance and its reciprocation is under the control of the operator. Also, in either its lowered or raised position, it is readily swung through an arc, because of the radial nature of the cantilevered boom which can be made to reach from one side of the tractor to the opposite side thereof when necessary. However, this is only accomplished when the nature of the upstanding obstacles, such as high fences, trees, telegraph poles and the like are of greater height than the radial or cantilevered boom.

It will thus be seen that the objects hereinbefore set forth may readily and efficiently be obtained and since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A mowing machine of the character described, adapted to be connected to a tractor, which comprises a tandem mowing mechanism adapted to mow along a single continuous path on both sides of an obstacle upwardly projecting from the ground line in the path thereof; said mechanism including a first device having a cutter means adapted to mow in a path along the near side of said obstacle; a first actuatable means mounted at one end on said tractor and laterally extending therefrom to mount said first device at its other end; a second device having a cutter means adapted to mow in a path along the far side of said obstacle; a second actuatable means mounted at one end on said tractor and laterally extending therefrom to mount said second device at its other end; and a primary power means mounted on said tractor and cooperatively connected with said cutter devices to actuate the same, and to motivate said first and second actuatable means to shift said devices into and out of operating position with respect to both the near and far sides of said obstacle, both of said cutter means being mounted upon and operated from said tractor independently of each other, and adapted to be moved toward each other into contacting relation, as well as away from each other in spaced relation to pass said obstacles therebetween, and further characterized in that said first actuatable means comprises a boom pivotally and slidably mounted laterally of the side of the tractor, and means, cooperatively connected therewith and with said primary power means, to raise and lower said boom, and said first device slidably to actuate said boom, and wherein said boom is mounted to pivot vertically, and simultaneously to move toward said tractor and away from said obstacle under the weight of said first device when raised above its horizontal plane, and a spring on said boom automatically to urge the return of said device toward said obstacle and away from said tractor to normal operating position when said boom is lowered below its horizontal plane.

2. A mowing machine of the character described, adapted to be connected to a tractor, which comprises a tandem mowing mechanism adapted to mow along a single continuous path on both sides of an obstacle upwardly projecting from the ground line in the path thereof; said mechanism including a first device having a cutter means adapted to mow in a path along the near side of said obstacle; a first actuatable means mounted at one end on said tractor and laterally extending therefrom to mount said first device at its other end; a second device having a cutter means adapted to mow in a path along the far side of said obstacle; a second actuatable means mounted at one end on said tractor and laterally extending therefrom to mount said second device at its other end; and a primary power means mounted on said tractor and cooperatively connected with said cutter devices to actuate the same, and to motivate said first and second actuatable means to shift said devices into and out of operating position with respect to both the near and far sides of said obstacle, both of said cutter means being mounted upon and operated from said tractor independently of each other, and adapted to be moved toward each other into contacting relation, as well as away from each other in spaced relation to pass said obstacles therebetween, and further characterized in that said second actuatable means comprises a radial means, and means, cooperatively connected therewith and with said primary power means, to motivate said radial means through an arc extending between the near and far sides of said obstacle.

3. A mowing machine according to claim 2, and wherein said radial means includes a mast, a cantilever boom secured thereto, and said motivating means includes a piston cooperatively connected to said mast and to said primary means to rotate said boom.

4. A mowing machine according to claim 2, and wherein said radial means includes a reciprocable cantilever boom, and said actuatable means also includes a piston cooperatively connected to said boom and to said primary means through said motivating means to reciprocate said boom toward and away from said obstacle.

5. A mowing machine according to claim 2, and wherein said radial means includes a cantilever boom, and said actuatable means comprises a motor and winch mounted on said boom cooperatively connected to the second cutter device and to said primary means to raise and lower said device.

6. A mowing machine as set forth in claim 5, in which said cantilever boom is provided at its ends with a crosstree, guide members at the ends of said crosstree, guide rods connected to said second cutter device and slidably mounted in said guide members, and in which the motor for said winch is hydraulically operated.

7. A mowing machine of the character described, adapted to be connected to a tractor, which comprises a tandem mowing mechanism adapted to mow along a single continuous path on both sides of an obstacle upwardly projecting from the ground line in the path thereof; said mechanism including a first device having a cutter means adapted to mow in a path along the near side of said obstacle; a first actuatable means mounted at one end on said tractor and laterally extending therefrom to mount said first device at its other end; a second device having a cutter means adapted to mow in a path along the far side of said obstacle; a second actuatable means mounted at one end on said tractor and laterally extending therefrom to mount said second device at its other end; and a primary power means mounted on said tractor and cooperatively connected with said cutter devices to actuate the same, and to motivate said first and second actuatable means to shift said devices into and out of operating position with respect to both the near and far sides of said obstacle, both of said cutter means being mounted upon and operated from said tractor independently of each other, and adapted to be moved toward each other into contacting relation, as well as away from each other in spaced relation to pass said obstacle therebetween, and further characterized in that said primary power means includes a power operated hydraulic system of conduits in line circuit with said first and second actuatable means and said tandem mowing mechanism.

8. A mowing machine according to claim 7, and wherein said system includes a storage tank for said fluid, a pump communicating with said tank and said conduits, and a motor to operate said pump.

References Cited in the file of this patent

UNITED STATES PATENTS

| | | |
|---|---|---|
| 1,869,394 | Sikma | Aug. 2, 1932 |
| 2,411,623 | Jaques | Nov. 26, 1946 |
| 2,648,940 | Merkley et al. | Aug. 18, 1953 |
| 2,732,675 | Smith et al. | Jan. 31, 1956 |
| 2,791,081 | Allen et al. | May 7, 1957 |
| 2,838,901 | Davis | June 17, 1958 |
| 2,851,842 | Harp | Sept. 16, 1958 |